United States Patent
Seaman et al.

(10) Patent No.: US 10,546,384 B2
(45) Date of Patent: Jan. 28, 2020

(54) METHOD AND SYSTEM FOR MAPPING TO FACILITATE DISPATCHING

(71) Applicant: BlackBerry Limited, Waterloo (CA)

(72) Inventors: Conrad Delbert Seaman, Ottawa (CA); Stephen West, Manotick (CA); Derek John Kuhn, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 27 days.

(21) Appl. No.: 15/656,397

(22) Filed: Jul. 21, 2017

(65) Prior Publication Data

US 2019/0026915 A1 Jan. 24, 2019

(51) Int. Cl.
| | |
|---|---|
| *G06K 9/00* | (2006.01) |
| *G06T 7/70* | (2017.01) |
| *G06F 3/0484* | (2013.01) |
| *G06K 9/20* | (2006.01) |
| *G06K 9/58* | (2006.01) |
| *H04N 5/247* | (2006.01) |

(52) U.S. Cl.
CPC ............. *G06T 7/70* (2017.01); *G06F 3/0484* (2013.01); *G06K 9/2063* (2013.01); *G06K 9/58* (2013.01); *H04N 5/247* (2013.01); *G06T 2207/30204* (2013.01); *G06T 2207/30232* (2013.01); *G06T 2207/30244* (2013.01)

(58) Field of Classification Search
CPC ...... B60R 2300/808; B60R 2001/1253; B60R 2300/105; G06Q 10/08; G06Q 10/0833; G06Q 10/083; G06T 7/00; G06T 7/70
See application file for complete search history.

(56) References Cited

U.S. PATENT DOCUMENTS

| | | | |
|---|---|---|---|
| 6,356,802 B1 | 3/2002 | Takehara et al. | |
| 7,181,312 B2 | 2/2007 | Takehara et al. | |
| 7,508,956 B2 | 3/2009 | Scheppmann | |
| 9,619,725 B2 | 4/2017 | King | |
| 2002/0191813 A1* | 12/2002 | Uchida | B66C 13/085 382/100 |
| 2004/0030478 A1* | 2/2004 | Holland | B65G 63/004 701/50 |
| 2005/0027435 A1* | 2/2005 | Scheppmann | G06K 9/00785 701/117 |
| 2005/0192702 A1* | 9/2005 | Moutsokapas | B65G 63/004 700/213 |
| 2009/0109295 A1* | 4/2009 | King | B66F 9/0755 348/211.99 |
| 2011/0010005 A1* | 1/2011 | Tan | G06Q 10/08 700/214 |

(Continued)

OTHER PUBLICATIONS

International Searching Authority, International Search Report and Written Opinion for International Application No. PCT/CA2018/050871, dated Oct. 22, 2018.

*Primary Examiner* — Vu Le
*Assistant Examiner* — Guillermo M Rivera-Martinez
(74) *Attorney, Agent, or Firm* — Moffat & Co

(57) ABSTRACT

A method at a server for container location verification within a container yard, the method including requesting image data from at least one image sensor apparatus affixed to a container within the container yard; receiving the image data; and processing the image data to identify a location of a target container.

19 Claims, 10 Drawing Sheets

(56) References Cited

U.S. PATENT DOCUMENTS

| | | | |
|---|---|---|---|
| 2011/0055172 A1* | 3/2011 | Tan | G06F 17/30241 |
| | | | 707/692 |
| 2012/0050531 A1* | 3/2012 | Wu | G08B 13/08 |
| | | | 348/143 |
| 2012/0051643 A1 | 3/2012 | Ha et al. | |
| 2013/0342653 A1 | 12/2013 | McCloskey et al. | |
| 2014/0009612 A1* | 1/2014 | King | B66F 9/0755 |
| | | | 348/143 |
| 2014/0036072 A1* | 2/2014 | Lyall | G06K 9/00771 |
| | | | 348/143 |
| 2015/0225104 A1* | 8/2015 | Reed | B65C 1/028 |
| | | | 347/110 |
| 2016/0167932 A1* | 6/2016 | Holmberg | B66C 13/085 |
| | | | 382/104 |
| 2016/0297361 A1 | 10/2016 | Drazan et al. | |

* cited by examiner

METHOD AND SYSTEM FOR MAPPING TO FACILITATE DISPATCHING

FIELD OF THE DISCLOSURE

The present disclosure relates to shipping or trailer yards, and in particular relates to the finding of a particular shipping container or trailer within such yards.

BACKGROUND

Shipping yards may be massive, covering many acres of land. Further, in yards such as rail yards, trailer yards or shipping yards, the yards may shift over time. They may overflow into adjacent areas, fields or parking lots. They may also shrink. Yards may grow out or up, and they may "move" over time, for example into lanes and alleys, parking locations may drift among other challenges.

One issue in managing yards of trailers or containers is locating the suitable trailer for the next load. Typically, yard managers know which trailers are empty or full based on yard location or memory, and they may direct a shunt driver to obtain an empty or full trailer and deliver it to the front of the yard to be ready for transport.

A shunt vehicle is basically a vehicle that can pick up a trailer or container and pull it or carry it to the front of the yard for dispatch.

One issue is that, upon being instructed to shunt a trailer or container, the target is often not at its specified location. Furthermore, location technologies such as GPS can be inaccurate by 10, 100 or even 1000 meters, depending on signal strength and power use of the GPS receiver.

If a shunt vehicle is dispatched to a location incorrectly, it may waste time. In the real world, in many cases the driver of the shunt vehicle can spend 15 to 30 minutes searching for a container or radioing back for a lost container. Further, for future autonomous vehicles, incorrect dispatching of such vehicle wastes fuel energy, adds traffic to the yard as well as wasting time for other dispatching jobs.

BRIEF DESCRIPTION OF THE DRAWINGS

The present disclosure will be better understood with reference to the drawings, in which.

DETAILED DESCRIPTION OF THE DRAWINGS

Figure 1:
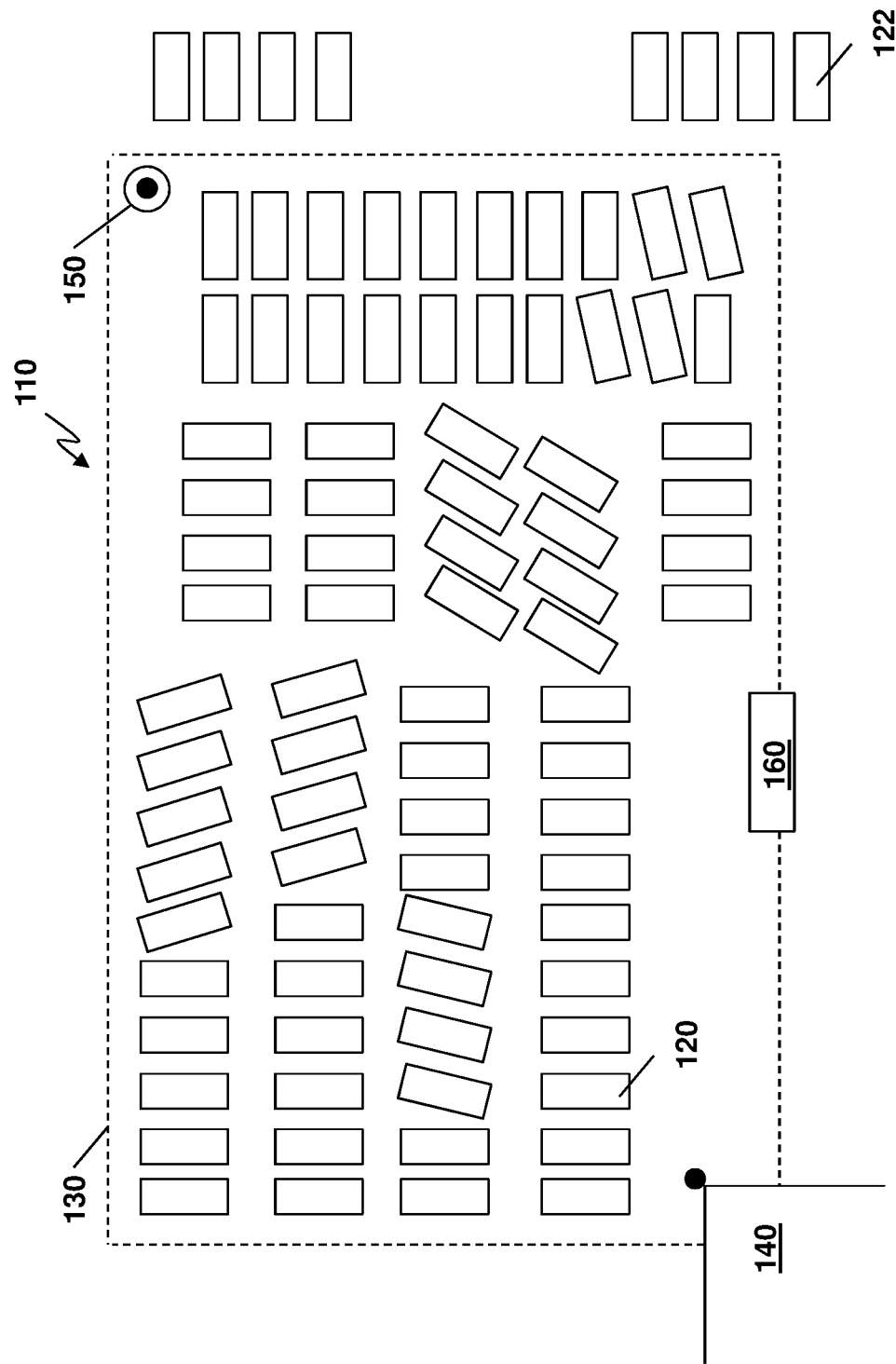
FIG. 1 is a block diagram showing an example configuration of shipping containers in a container yard.

The present disclosure provides a method at a server for container location verification within a container yard, the method comprising: requesting image data from at least one image sensor apparatus affixed to a container within the container yard; receiving the image data; and processing the image data to identify a location of a target container.

The present disclosure further provides a server configured for container location verification within a container yard, the server comprising: a processor; and a communications subsystem, wherein the server is configured to: request image data from at least one image sensor apparatus affixed to a container within the container yard; receive the image data; and process the image data to identify a location of a target container.

The present disclosure further provides a computer readable medium for storing instruction code, which when executed by a processor of a server configured for container location verification within a container yard cause the server to: request image data from at least one image sensor apparatus affixed to a container within the container yard; receive the image data; and process the image data to identify a location of a target container.

In accordance with embodiments of the present disclosure, methods and systems are provided for using asset tracking devices to confirm trailer location before dispatching shunt vehicles or drivers. Such assets tracking devices may include a camera to provide visual confirmation of container location.

Specifically, the present disclosure provides for the use of an image sensor apparatus affixed to trailers or shipping containers to create a network of cameras within the container yard, and then use the network of cameras to validate the locations of containers before dispatch. Such embodiments work even if not every container is equipped with such image sensor apparatus. As provided below, even if a penetration is relatively low, such as 10%, since such asset tracking devices may be spread across the yard there are many potential cameras that can be used to try and obtain the actual view of the target container.

Further, in accordance with the embodiments described below, supplemental information such as the location of the image sensor apparatus, compass direction of the field of view of the image sensor apparatus, among other information, may be combined with captured images in some cases.

Captured images may be provided to a central station in which either a human or computer can then determine if the trailer in question is actually at its anticipated location. The captured image may be from the trailer of interest, or may be from surrounding trailers. If human processing is used, the image from the image data may be provided on a user interface. If machine processing is used, optical scanning may be used to read information from containers within the image. Such information may include license plates, identifier information written on the trailers, colors of trailers, or other identifying information.

Utilizing the embodiments above, the shunt vehicle is only dispatched to a location after a confirmation is made that the trailer or container is where it is expected, thereby saving resources for the yard management.

In accordance with further embodiments, if a container is not located where it is expected, a search for the container can be expanded by obtaining images from other image capture apparatuses in the container yard. The search for the container may utilize an expanding network of image sensor apparatuses, for example, until the container is found.

Such embodiments are described in more detail below.

Reference is now made to FIG. 1, which shows a simplified environment of a storage yard 110. Storage yard 110 includes a plurality of shipping containers 120. In some cases, the shipping containers 120 may be within a fenced area 130. However, due to the dynamic nature of the shipping yard, some containers, shown with reference 122, are outside of the fenced area 130. Further, in many cases storage yard 110 may simply be too big to have a fenced area 130.

Fixed infrastructure points within the storage yard 110 may exist. For example, a building 140 or a fixed structure 150 such as a lamppost, security pole, or crane, among other options, may exist within the storage yard 110.

Shipping containers 120 or 122 may be placed in rows, or stacked, or simply deposited in an empty location.

In accordance with one aspect of the present disclosure, a dynamic and distributed image capture system is provided. In particular, in one embodiment, a subset of containers 120 or 122 may have associated therewith an image sensor apparatus that can be triggered to start or stop capturing images and communicate the results to a centralized server.

Such image sensor apparatus may, in some embodiments, be a power limited device, such as a battery-operated device, to allow the system to be deployed without a fixed power supply. However, because the image capture device is power limited, it cannot continuously capture images without quickly draining the battery or otherwise taxing the power source.

In one embodiment, the image sensor apparatus uses fleet management tracking devices on the shipping containers 120 or 122. Specifically, in many instances shipping containers or truck trailers are equipped with sensors that may have communication capabilities and provide information about such shipping container or trailer. For example, the sensors may provide temperature readings, location readings through a positioning system such as the global positioning system (GPS), vibration sensors, accelerometers, gyroscopes, among other sensor information.

In one embodiment of the present disclosure, a camera may be added to such tracking device. In a further embodiment, an image capture apparatus may be provided as a standalone solution, outside of any tracking system.

Figure 2:
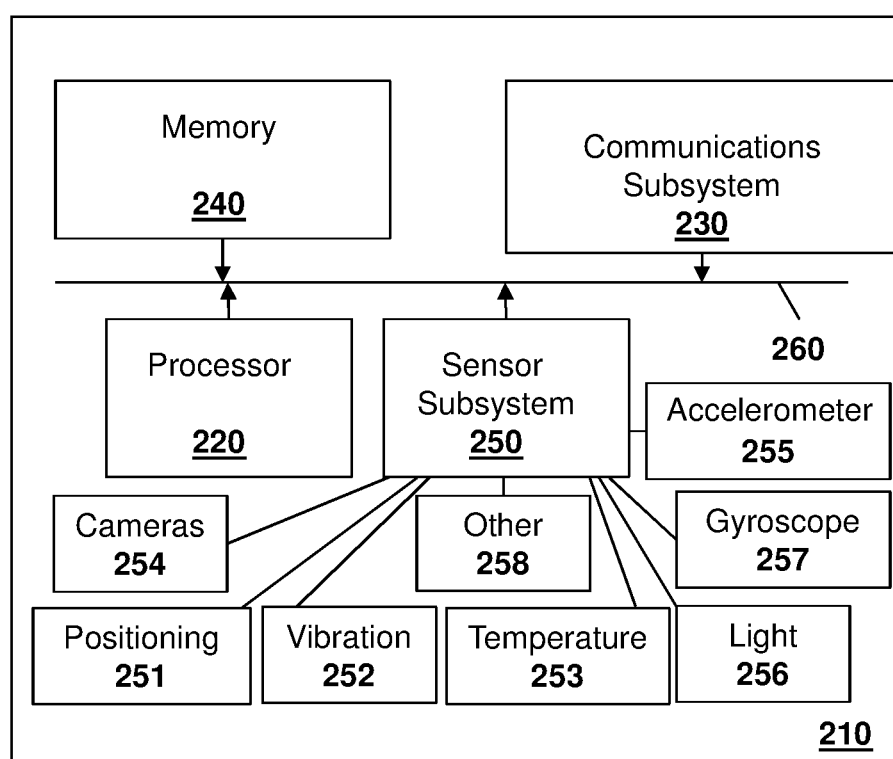
FIG. 2 is a block diagram of an example image sensor apparatus capable of being used with the embodiments herein.

Reference is now made to FIG. 2, which shows an example image sensor apparatus 210. Image sensor apparatus can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Image sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows device 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), near field communications (NFC), Zigbee, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 230 will be dependent upon the communication network or communication technology on which the image sensor apparatus is intended to operate.

Processor 220 generally controls the overall operation of the image capture device 210 and is configured to execute programmable logic, which may be stored, along with data, using memory 240. Memory 240 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 240, image sensor apparatus 210 may access data or programmable logic from an external storage medium, for example through communications subsystem 230.

In the embodiment of FIG. 2, image sensor apparatus 210 may utilize a plurality of sensors, which may either be part of image sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors 254, accelerometer 255, light sensors 256, gyroscopic sensors 257, and other sensors 258. Other sensors may be any sensor that is capable of reading or obtaining data that may be useful for image sensor apparatus 210. However, the sensors shown in the embodiment of FIG. 2 are merely examples, and in other embodiments different sensors or a subset of sensors shown in FIG. 2 may be used.

Communications between the various elements of image sensor apparatus 210 may be through an internal bus 260 in one embodiment. However, other forms of communication are possible.

Image sensor apparatus 210 may be affixed to any fixed or portable platform. For example, image sensor apparatus 210 may be affixed to shipping containers, rail cars, truck trailers, truck cabs in one embodiment. In other embodiments, image sensor apparatus 210 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others. As used herein, a container can include any shipping container, rail car, truck trailer, truck cab or vehicle.

In other cases, image sensor apparatus 210 could be carried by a user.

In other cases, sensor apparatus 210 may be affixed to stationary objects including buildings, lamp posts, fences, cranes, among other options.

Such sensor apparatus 210 may be a power limited device. For example image sensor apparatus 210 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 210 may utilize external power, for example from the engine of a tractor pulling the trailer, from a land power source for example on a plugged in recreational vehicle or from a building power supply, among other options.

External power may further allow for recharging of batteries to allow the sensor apparatus 210 to then operate in a power limited mode again. Further, recharging methods may also include other power sources, such as, but not limited to, solar, electromagnetic, acoustic, or vibration charging.

Referring again to FIG. 1, if the sensor apparatus 210 from FIG. 2 is affixed to a plurality of the shipping containers 120 then a dynamic network for the capturing of images may be created as described below. Specifically, assuming that the image sensor apparatus 210 is installed on a number of cargo containers or shipping containers, then even at low penetration rates a given yard may have a number of cameras. For example, even at penetration rates of 1%, 5% or 10%, a yard that has a hundred or a thousand shipping containers will have many cameras that are available for container location and mapping.

Due to the nature of the storage yard 110, the cameras would likely be distributed around the yard. Further, since shipping containers may be stacked or parallel or perpendicular or at other angles to each other, the image capture mechanism may provide various angles to allow for a comprehensive container location mapping and verification system, as described below.

Figure 3:
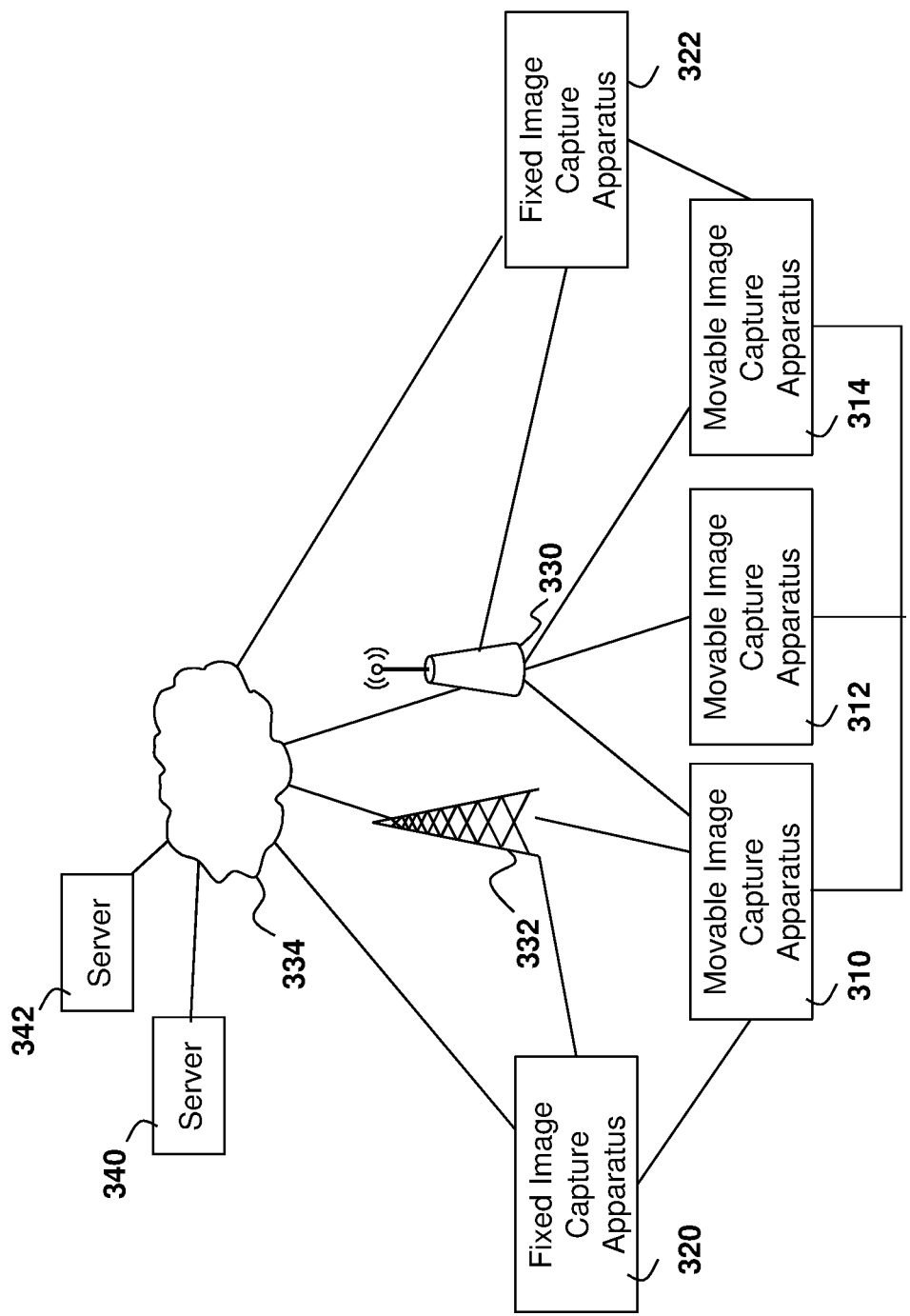
FIG. 3 is a block diagram showing communications between servers and shipping containers.

Reference is now made to FIG. 3, which shows one example architecture that may be utilized in accordance with the present disclosure. In particular, the example architecture of FIG. 3 has three movable image sensor apparatuses, namely image sensor apparatus 310, image sensor apparatus 312, and image sensor apparatus 314.

Further, a plurality of fixed image sensor apparatus may exist within the network in some embodiments. These are shown, for example, as fixed sensor apparatus 320 and fixed sensor apparatus 322.

In the embodiment of FIG. 3, the movable sensor apparatuses 310, 312 and 314 communicate through an access point 330 or base station 332, and thereby can communicate over a wide area network such as the Internet 334. In other embodiments, the movable sensor apparatuses 310, 312 and 314 may communicate through other mechanisms over Internet 334, such as a fixed connection or any other wired or wireless communications.

Further, fixed sensor apparatus 320 and fixed sensor apparatus 322 may communicate with access point 330 or base station 332 in some embodiments. In other embodiments, the fixed sensor apparatus 320 and/or fixed sensor apparatus 322 may communicate through other mechanisms over Internet 334, such as a fixed connection or any other wired or wireless communications.

While the embodiment of FIG. 3 only shows one access point 330, in other embodiments a plurality of access points may be provided within a container yard.

Further, the information from any of sensor apparatus 310, 312, 314, 320 and 322 may be provided to one or more servers 340 or 342. For example, if the sensor apparatus 310 and 312 belong to a first company, such apparatus may communicate with a first company's server 340. Sensor apparatus 314 may belong to a second company and may therefore communicate with a second company's server 342.

In other embodiments, a single company may have a plurality of servers. A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 310, 312, 314, etc. For example, the server may be located essentially anywhere so long as it has network access (e.g., 334) to communicate with image capture apparatuses 310, 312, 314, etc.

In accordance with one embodiment of the present disclosure, the various fixed or mobile sensor apparatuses may also communicate with each other. Thus, apparatus 310 may communicate directly with apparatus 312 or apparatus 314 in some embodiments. Further, apparatus 310 may communicate with fixed apparatus 320 or 322 in some embodiments.

Further, the owners of the servers 340 and 342 may have agreements to allow communication between such servers.

The example architecture of FIG. 3 is merely provided for illustration purposes and is not limiting to any particular apparatus or architecture. For example, in some cases apparatus 310 may only be able to communicate with apparatus 312 since they are owned by the same company. In other cases, apparatus 310 could communicate with apparatus 314 if there is an agreement for security purposes. In other cases, apparatus 310 may not be able to communicate directly with apparatus 322 since the distance between the two may be too far to allow for such communications.

In other cases, apparatus 310 may be out of range of access point 330 and may therefore utilize another apparatus such as apparatus 312 as a relay for providing information to server 340.

As described above, in many cases, an image sensor apparatus may be a limited power device. For example, the device may operate using a battery. Because of the limited power, the image sensor apparatus does not continually capture images. Continual image capture would drain the battery far too quickly and provide information which may not be relevant most the time. Thus, in accordance with the embodiments described herein, a sensor apparatus may act based on a trigger. As described below, the trigger may be an indication from other sensors of the sensor apparatus that the container has stopped moving for a threshold time period, a message from a network node or another sensor apparatus requesting image data, among other options.

Preliminarily data on the location of a container may be based on manual mapping, rough GPS fixes, or based on dynamic mapping. In accordance with a first embodiment of the present disclosure, a network server may build a map of a shipping yard that may be dynamically updated over time. Such map may, for example, be used as a preliminary location tool to find a particular shipping container.

Figure 4:
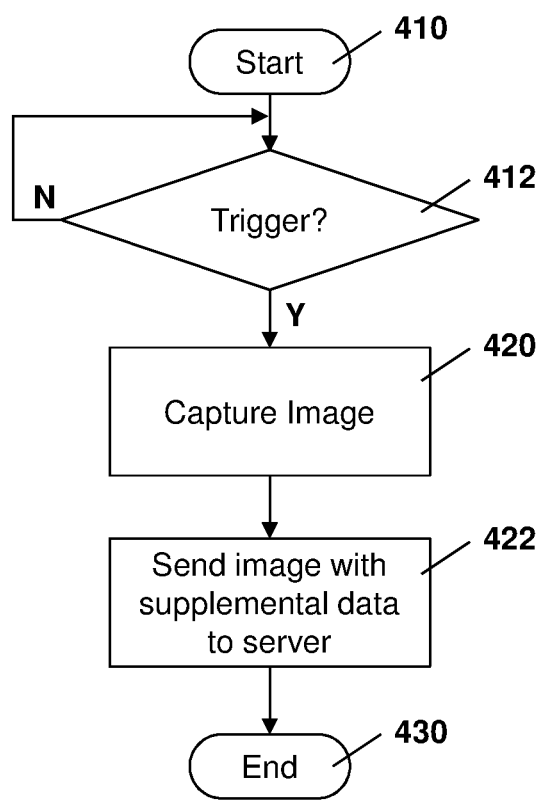
FIG. 4 is a process diagram showing an example process at an image sensor apparatus for capturing and transmitting image data.

Reference is now made to FIG. 4, which shows a process at an image sensor apparatus on a shipping container to facilitate the creation of a map. The process of FIG. 4 starts at block 410 and proceeds to block 412 in which a check is made to determine whether a trigger condition has been met. In particular, the map may need to be updated once preconditions are met. For example, if the shipping container has stopped moving for a threshold period of time, for example 15 minutes, then this may indicate that the shipping container is in its final position and thus a cause a trigger to capture images. In other cases, supplemental information such as global positioning system data may be further used with the trigger conditions to ensure that the shipping container is within a trailer yard. Thus, if the shipping container has entered into a geofenced area around the shipping yard, this may indicate that the image capture may be needed. Conversely, if the trailer is located outside of the geofenced area then the shipping container stopping for 15 minutes may merely indicate that the driver is a rest period at a rest station or at a location outside the shipping yard and therefore image capture may not be required. Other examples of triggers are possible.

If the threshold is not met at block 412, the process proceeds back to block 412 and continues to loop until a threshold condition is met.

From block 412, once the threshold condition is met, the process proceeds to block 420 in which the sensor apparatus may capture an image.

The process then proceeds to block 422 in which the sensor apparatus uses its communication system to send the image to a server. In accordance with some embodiments of the present disclosure, other supplemental data may also be sent to a server. Supplemental data at block 422 may include various information, including identifying information for the image sensor apparatus, a last GPS fix captured by the apparatus, or the direction that the container is facing for example derived from an internal compass type sensor on the image capture apparatus, among other information. However, in some cases no supplements information is provided.

From block 422 the process then proceeds to block 430 and ends.

On the server side, the server may maintain a map and dynamically update the map based on image capture data from a plurality of image sensor apparatuses. Specifically, the process at the server is shown with regard to FIG. 5 and starts at block 510. The process then proceeds to block 512 in which the image data, as well as potentially supplemental data, is received at the server.

The process then proceeds to block 520 in which the image data may be used to determine the location of the container. The step at block 520 may involve providing information on a user interface of a computing device to have an operator determine from various information within the image the location of the trailer. Such information may, for example, include images of fixed structures, other containers within the image that have a known location, among other such information. Further, supplemental information such as the position data or the bearing data of the image sensor may be used to narrow the possible locations of such container.

In other embodiments, the step at block 520 may use optical recognition or other automatic processing to determine the location of the container. For example, such optical recognition may use optical character recognition to determine the neighboring shipping containers based on identification printed on such shipping containers. Further, the optical recognition may utilize a database of images of known fixed structures within such container yard in order to determine the location of the container in question. Optical recognition may be supplemented with the supplemental data to focus the image processing.

In either the human or automatic processing of the image, the use of the neighboring trailers may use, in some embodiments, two or more trailers to be identified and correlated with map data stored on the server. This may be used to ensure that a neighboring trailer has not been moved and is thus producing an incorrect location result.

From block 520, the process may optionally proceed to block 522 in which image processing is used on the remainder of the image to verify the location of other containers. For example, if an image contains data for six containers, if one of such containers is not in its anticipated location, the processing at block 522 may identify the new location of such container and update the map within the server to provide the correct location of such container.

From block 520 or block 522, the process may proceed to block 530 in which the map data within the server is updated.

The process then proceeds to block 540 and ends.

In some embodiments, the maintenance of the map at the server may request image information from various image sensor apparatuses periodically to ensure map integrity.

In other cases, map data may be updated upon dispatching a shunt vehicle.

Once a trailer needs to be obtained from the yard, a shunt vehicle may be dispatched to obtain the trailer. However, prior to the dispatching of such a shunt vehicle, the location of the trailer may be verified.

Figure 5:
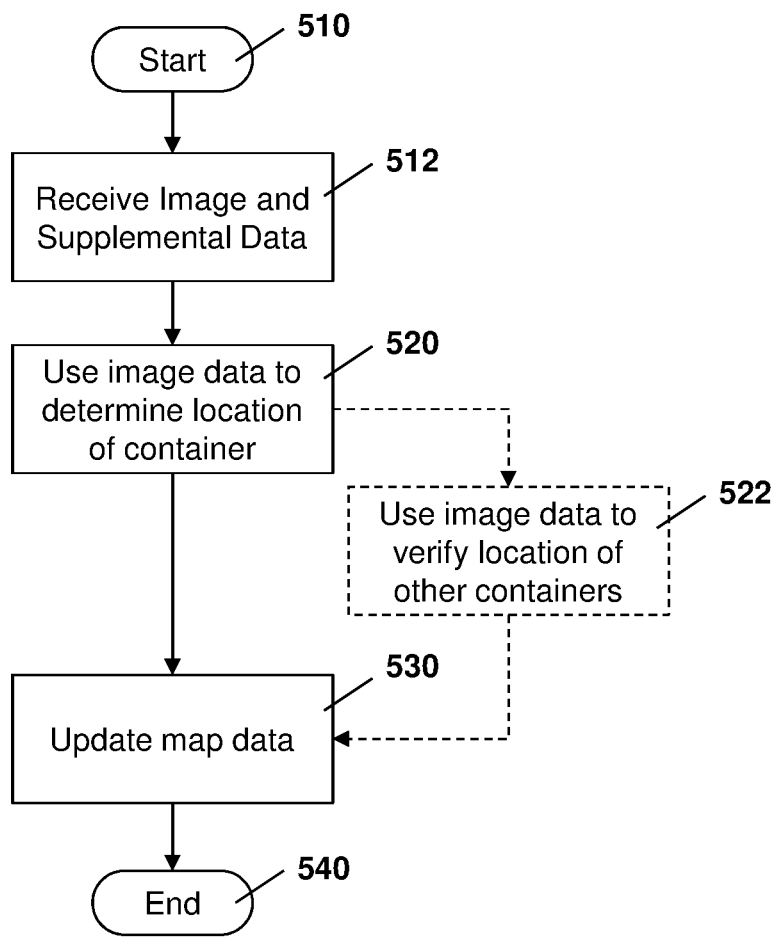
FIG. 5 is a process diagram showing and example process at a server for receiving and processing image data to create a dynamic map of a container yard.

The verification of the location of the container may be done utilizing a map as created in the embodiments described with regard to FIGS. 4 and 5 above, or may be based on manual mapping, GPS data or other location based techniques if no such map exists. However, prior to dispatch, the verification of the location of the container is made.

Figure 6:
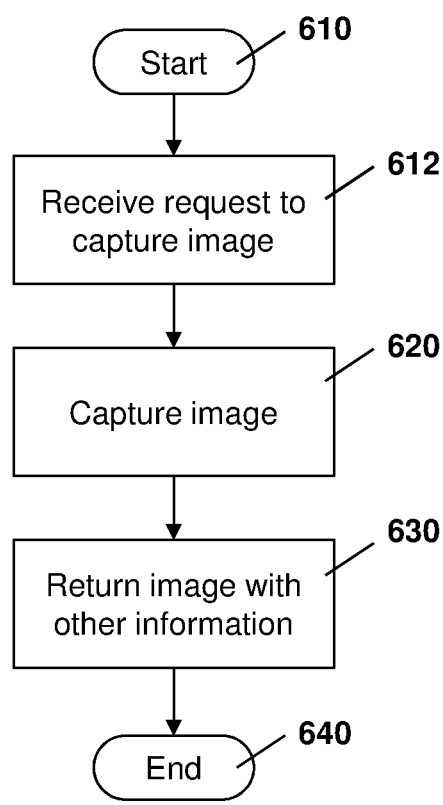
FIG. 6 is a process diagram showing an example process at an image sensor apparatus for capturing and transmitting image data prior to dispatch of a shunt vehicle.

Reference is now made to FIG. 6, which shows a process at a sensor apparatus device for use with the verification of the location of the container. The process of FIG. 6 starts at block 610 and proceeds to block 612 in which the image sensor apparatus may receive a request to capture an image. As will be appreciated, the image sensor apparatus may have a communication system which does not continuously listen to a communication channel. This may be done to save battery resources on the device if the device is a power limited device.

Therefore, the image sensor apparatus may periodically wake up the radio on the device to listen for requests and then resume a sleep state if no request is received during the opportunity window.

The request received at block 612 may come from a server, directly through an access point that the image sensor apparatus has registered with in some embodiments. In other embodiments, a second image sensor apparatus may be used as a relay, for example if the image sensor apparatus in question is out of coverage of an access point.

In the embodiment of FIG. 6, a request is received during the opportunity window at block 612 and the process proceeds to block 620 in which an image capture occurs.

The process then proceeds to block 630 in which the captured image, and optionally other supplemental information such as bearing or GPS location, may be returned to the server. The process then proceeds to block 640 and ends.

Figure 7:
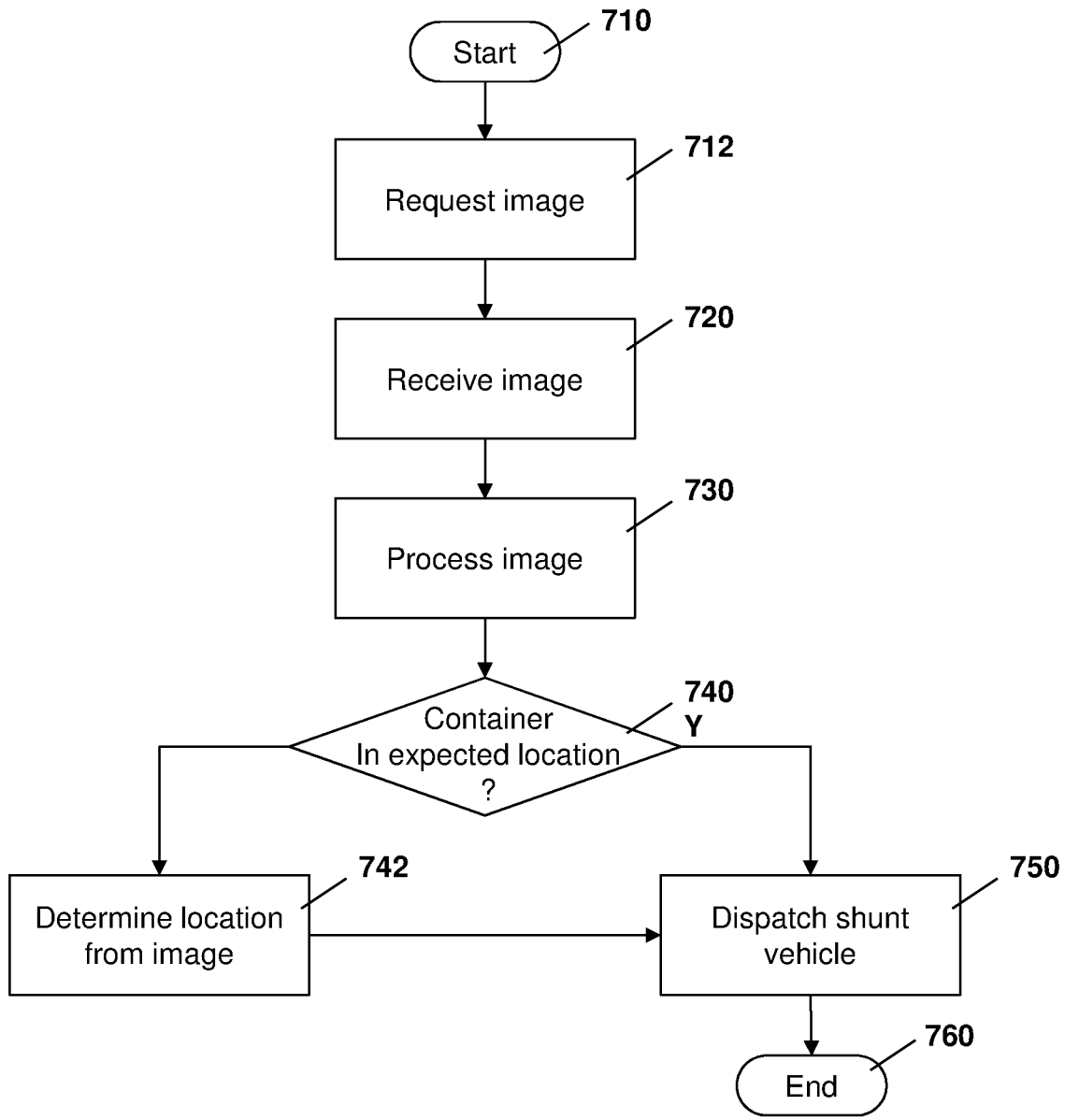
FIG. 7 is a process diagram showing an example process at a server for requesting and processing image data from a target shipping container.

At the server, an example process is shown with regard to FIG. 7. The process of FIG. 7 starts at block 710 and proceeds to block 712 in which an image request is made to a particular image sensor apparatus. Such image request may be continually or periodically made until a response is received.

A response to the image request is received at block 720. The response includes the received image and may include other supplemental information.

The process then proceeds from block 720 to block 730 in which the image is processed. Such image processing may, for example, merely compare the image received at block 720 with a previously stored image that was created, for example during a mapping process. If the images match, then the location of the shipping container has not changed. It should be noted that other factors within the image may change, such as the lighting, or the location of some of the shipping containers in the view of the image capture apparatus. However, if the image processing at block 730 determines the two images are sufficiently similar then it can be assumed that the location has been maintained.

From block 730 the process proceeds to block 740 in which a check is made to determine whether the container is in the expected location. If not, the process may then proceed to block 742 in which the location of the container is determined. For example, such determination at block 742 can be similar to the determination made at block 520 of FIG. 5.

From block 740, if the container is in the expected location, or based on the new location determined at block 742, the process proceeds to block 750 in which the shunt vehicle is dispatched to the now verified location of the shipping container. The process then proceeds to block 760 and ends.

In other embodiments, the target container may not have an image capture apparatus, or the image capture apparatus on the container may be obscured for some reason. In this case, in addition to or instead of capturing the image from the target container itself, image capture may occur based on surrounding sensor apparatuses.

Figure 8:
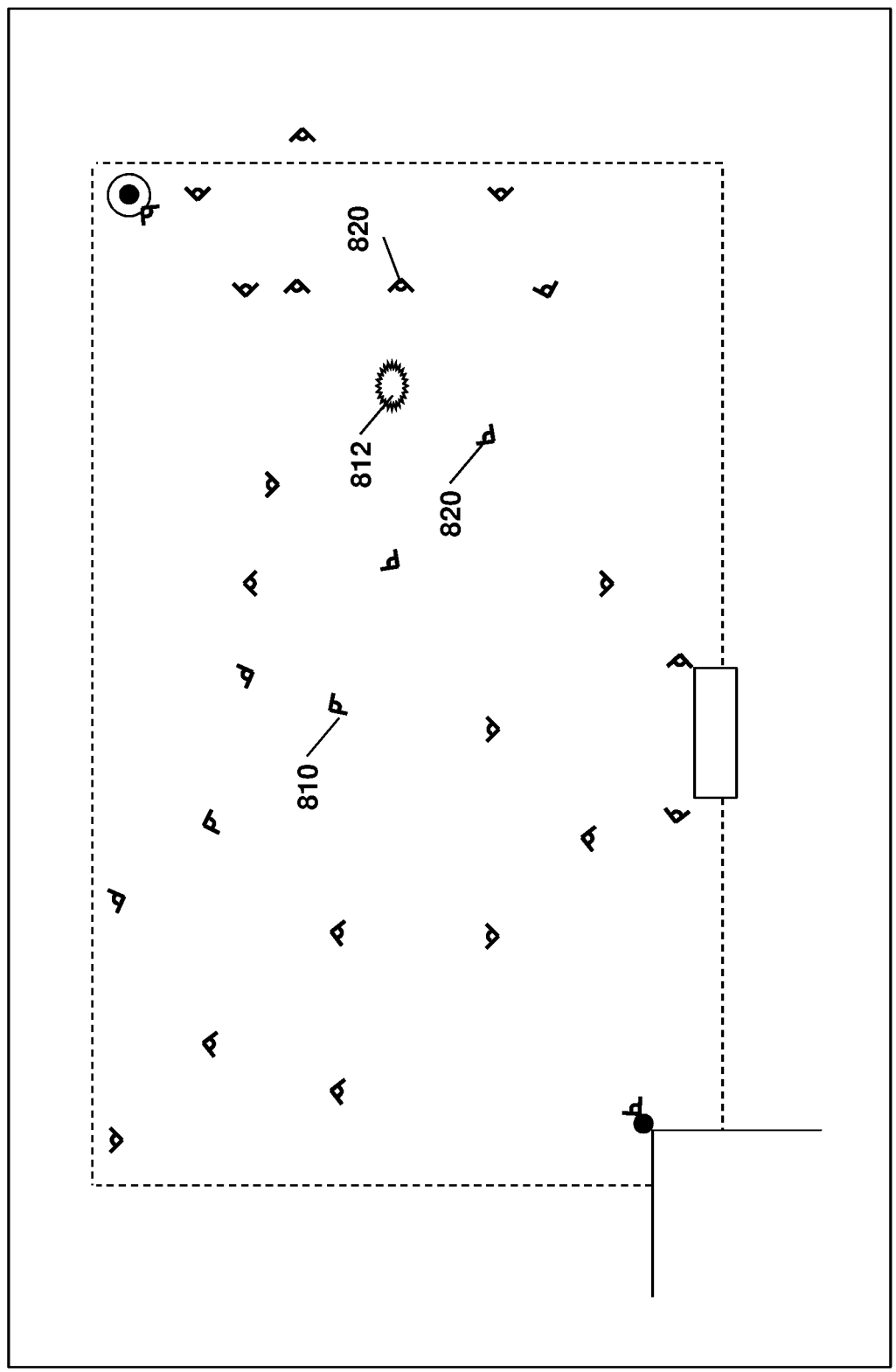
FIG. 8 is a block diagram showing an example map of image sensor apparatuses within a container yard.

For example, a shipping yard may maintain a map such as a map shown at FIG. 8, indicating the various sensor apparatuses that exist, including potentially the bearing of such sensor apparatuses. Referring to FIG. 8, the direction of each sensor apparatus 810 is shown. Therefore, based on either the mapping created with regard to FIGS. 4 and 5, or based on manual mapping or GPS data, a location or potential location of the shipping container can be provided on such map. This is shown with regard to potential location 812 on the map of FIG. 8.

An operator or the computer itself may then determine which image capture apparatuses may have the target shipping container in the potential field of view and make a request to such image capture apparatuses 820 to capture an image to verify the potential location 812. In some cases, only one image sensor apparatus may be asked to capture an image. In other cases, a plurality of image sensor apparatuses may be asked to capture images and such image data may be spliced together or compared.

Processing of a request for image capture from image sensor apparatuses 820 at each image sensor apparatus may use the process of FIG. 6.

Figure 9:
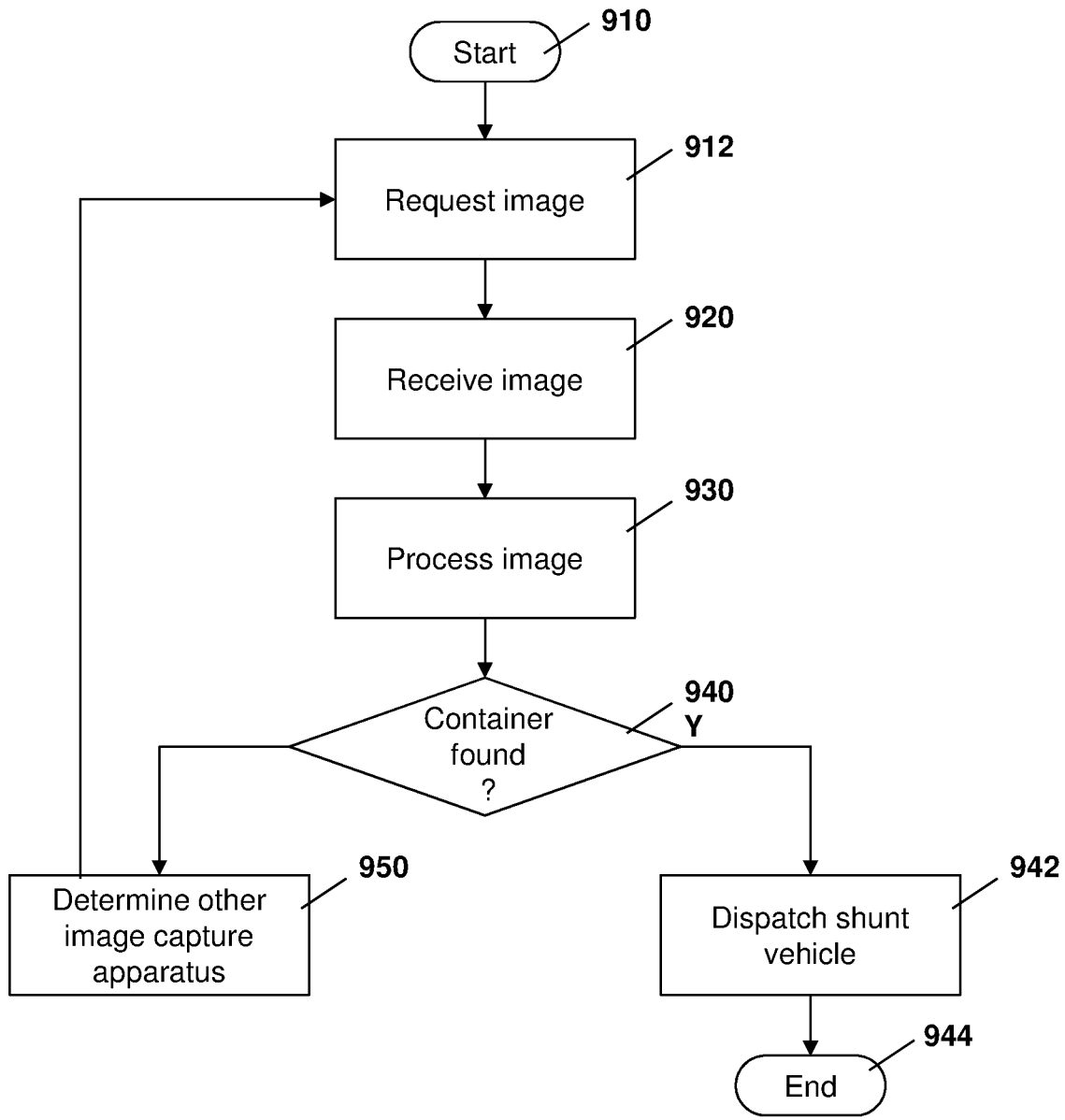
FIG. 9 is a process diagram showing an example process at a server for requesting and processing image data from image sensor apparatuses near a target shipping container.

With regard to network functionality, reference is now made to FIG. 9, which shows a process of a server for utilizing other containers to find a container of interest.

The process of FIG. 9 starts at block 910 and proceeds to block 912 in which the one or more sensor apparatuses are requested to capture an image.

Each of the sensor apparatuses that are requested to capture an image would then perform the process of FIG. 6 to capture and return the image and the image would be received at block 920 in the embodiment of FIG. 9. If a plurality of images are requested, each would be received at block 920.

From block 920 the process proceeds to block 930 in which the image or images are processed to determine whether the desired container is within the field of view and thus at its anticipated location. The image processing may be done by a human operator or automatically using optical recognition to look for markings on the exterior of the desired container. The container markings for a desired container would typically be known at the server.

The process then proceeds to block 940 in which a check is made to determine whether the container is found. If the container is found then the process may proceed to block 942 in which a shunt vehicle may be dispatched to the location of the container, the process may then proceed to block 944 and end.

Conversely, if the container is not found in the image or images received at block 920, the process may proceed to block 950 in which the scope of the search may be expanded. In particular, at block 950 other image capture apparatuses may be identified to help determine the location of the shipping container. Such identification may, for example, identify a threshold distance or radius from the anticipated location and use all image sensor apparatuses within such distance. In other cases, the search may be directionally focused, and identify devices on a certain bearing from the anticipated location. Other options for selecting image sensor apparatuses are possible.

From block 950, the process may proceed back to block 912 in which each identified image sensor apparatus is requested to perform an image capture. In this way, the process may then proceed back through blocks 912, 920 and 930 to process the additional images that were captured and a check may be made again at block 940 to determine whether the container was found.

If the container is still not found, then the scope of the search may again be expanded at block 950 and process may continue to loop in this way until the container is found, until images have been captured by all image sensor apparatuses, or until some maximum search criteria are met.

If the container is found, a map may be updated and the process proceeds to block 942 in which the shunt vehicle is dispatched to the verified location of the container.

Using the above, the shunt vehicles is only dispatched to a location after confirming that the container is where it is expected. This saves various resources, including time, fuel and enhances the operation of a shipping yard.

The server performing the embodiments above may be any network based server or combination of servers. One simplified server that may be used is provided with regards to FIG. 10.

Figure 10:
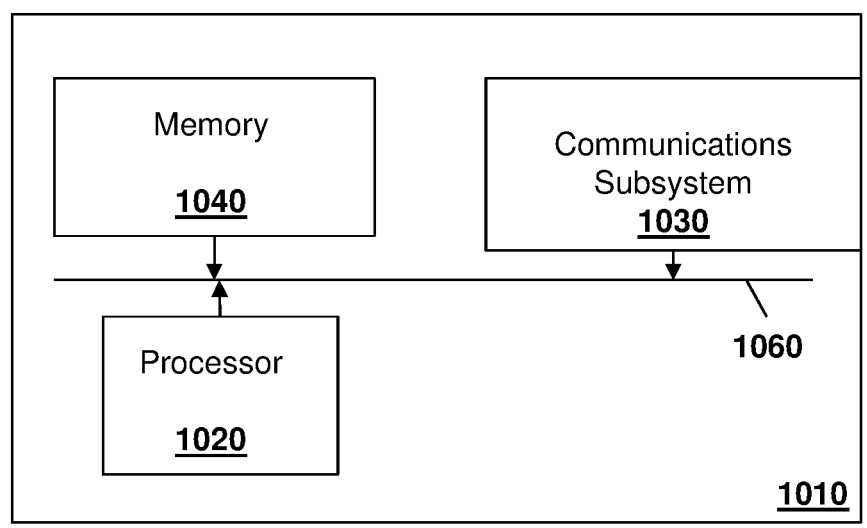
FIG. 10 is a block diagram of an example simplified computing device that may be used with the embodiments of the present disclosure.

In FIG. 10, server 1010 includes a processor 1020 and a communications subsystem 1030, where the processor 1020 and communications subsystem 1030 cooperate to perform the methods of the embodiments described herein.

Processor 1020 is configured to execute programmable logic, which may be stored, along with data, on server 1010, and shown in the example of FIG. 10 as memory 1040. Memory 1040 can be any tangible, non-transitory computer readable storage medium, such as optical (e.g., CD, DVD, etc.), magnetic (e.g., tape), flash drive, hard drive, or other memory known in the art.

Alternatively, or in addition to memory 1040, server 1010 may access data or programmable logic from an external storage medium, for example through communications subsystem 1030.

Communications subsystem 1030 allows server 1010 to communicate with other devices or network elements.

Communications between the various elements of server 1010 may be through an internal bus 1060 in one embodiment. However, other forms of communication are possible.

The embodiments described herein solve various issues. Specifically, the embodiments provide a low-cost solution since the image sensor apparatuses may already be part of containers, on vehicles or in other fixed situations. In the shipping yard example, the yard is typically covered relatively well since such shipping containers tend to get randomly distributed.

The embodiments described may provide image capture for various angles, increasing chances of finding a shipping container prior to dispatching a shunt vehicle.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a server for container location verification within a container yard, the method comprising:
   requesting image data from at least one image sensor apparatus affixed to a container within the container yard;
   receiving the image data, the image data comprising a location of the image sensor apparatus and a direction the image sensor apparatus is facing; and
   processing the image data to identify a location within the container yard of a target container based on the location of the image sensor apparatus and the direction the image sensor apparatus is facing,
   wherein the image data is from the image sensor apparatus on the target container, and
   wherein the processing identifies at least one of landmarks and neighboring containers.

2. The method of claim 1, wherein the processing uses optical recognition to identify markings on neighboring containers.

3. The method of claim 1, wherein the image data is from a neighboring container to the target container, and wherein the processing uses optical recognition to identify markings on the target container.

4. The method of claim 1, wherein the processing comprises displaying the image data on a user interface and receiving an input using the user interface.

5. The method of claim 1, further comprising, verifying the location of the target container and dispatching a shunt vehicle for the target container.

6. The method of claim 1, wherein if the processing does not find the target container, the method further comprising searching for the target container, the searching comprising:
identifying at least one image sensor apparatus;
obtaining image data from the at least one image sensor apparatus; and
processing the image data to determine whether an image of the target container is within the image data.

7. The method of claim 6, wherein the identifying comprises finding image sensor apparatuses within a threshold distance of an anticipated location of the target container.

8. The method of claim 7, wherein the threshold distance is increased if the image of the target container is not found within the image data.

9. The method of claim 1, further comprising receiving image data from a plurality of image sensor apparatuses; and
dynamically updating a map of the container yard based on information with the received image data.

10. A server configured for container location verification within a container yard, the server comprising:
a processor; and
a communications subsystem, wherein the server is configured to:
request image data from at least one image sensor apparatus affixed to a container within the container yard;
receive the image data, the image data comprising a location of the image sensor apparatus and a direction the image sensor apparatus is facing; and
process the image data to identify a location within the container yard of a target container based on the location of the image sensor apparatus and the direction the image sensor apparatus is facing,
wherein the image data is from the image sensor apparatus on the target container, and
wherein the processing identifies at least one of landmarks and neighboring containers.

11. The server of claim 10, wherein the processing uses optical recognition to identify markings on neighboring containers.

12. The server of claim 10, wherein the image data is from a neighboring container to the target container, and wherein the processing uses optical recognition to identify markings on the target container.

13. The server of claim 10, wherein the server is configured to process by displaying the image data on a user interface and receive an input using the user interface.

14. The server of claim 10, wherein the server is further configured to verify the location of the target container and dispatch a shunt vehicle for the target container.

15. The server of claim 10, wherein, if the server during processing does not find the target container, the server is further configured to search for the target container, the searching comprising:
identifying at least one image sensor apparatus;
obtaining image data from the at least one image sensor apparatus; and
processing the image data to determine whether an image of the target container is within the image data.

16. The server of claim 15, wherein the server is configured to identify by finding image sensor apparatuses within a threshold distance of an anticipated location of the target container.

17. The server of claim 16, wherein the threshold distance is increased if the image of the target container is not found within the image data.

18. The server of claim 10, wherein the server is further configured to receive image data from a plurality of image sensor apparatuses; and
dynamically update a map of the container yard based on information with the received image data.

19. A non-transitory computer readable medium for storing instruction code, which when executed by a processor of a server configured for container location verification within a container yard cause the server to:
request image data from at least one image sensor apparatus affixed to a container within the container yard;
receive the image data, the image data comprising a location of the image sensor apparatus and a direction the image sensor apparatus is facing; and
process the image data to identify a location within the container yard of a target container based on the location of the image sensor apparatus and the direction the image sensor apparatus is facing,
wherein the image data is from the image sensor apparatus on the target container, and
wherein the processing identifies at least one of landmarks and neighboring containers.

* * * * *